US008878917B2

(12) United States Patent
Kleinberger

(10) Patent No.: US 8,878,917 B2
(45) Date of Patent: Nov. 4, 2014

(54) POSITION-PERMISSIVE AUTOSTEREOSCOPIC DISPLAY SYSTEMS AND METHODS

(75) Inventor: Paul Kleinberger, Jerusalem (IL)

(73) Assignee: EHN Spire Limited Liability Company, Dover, DE (US)

( * ) Notice: Subject to any disclaimer, the term of this patent is extended or adjusted under 35 U.S.C. 154(b) by 973 days.

(21) Appl. No.: 12/988,838

(22) PCT Filed: Apr. 22, 2009

(86) PCT No.: PCT/IL2009/000438
§ 371 (c)(1),
(2), (4) Date: Oct. 21, 2010

(87) PCT Pub. No.: WO2009/130699
PCT Pub. Date: Oct. 29, 2009

(65) Prior Publication Data
US 2011/0032346 A1    Feb. 10, 2011

Related U.S. Application Data

(60) Provisional application No. 61/071,314, filed on Apr. 22, 2008.

(51) Int. Cl.
H04N 13/04        (2006.01)
(52) U.S. Cl.
CPC ....... *H04N 13/0422* (2013.01); *H04N 13/0418* (2013.01); *H04N 13/0411* (2013.01); *H04N 13/0413* (2013.01); *H04N 13/1404* (2013.01)
USPC ............................................. 348/59; 348/60

(58) Field of Classification Search
CPC .......... H04N 13/0402; H04N 13/0404; H04N 13/0422
USPC ............................................. 348/59, 60
See application file for complete search history.

(56) References Cited

U.S. PATENT DOCUMENTS 5,349,379 A * 9/1994 Eichenlaub .................... 348/59
5,629,798 A   5/1997 Gaudreau
5,822,117 A * 10/1998 Kleinberger et al. ......... 359/465

(Continued)

FOREIGN PATENT DOCUMENTS

GB    2405543         3/2005
GB    2405543 A   *   3/2005

(Continued)

OTHER PUBLICATIONS

European Search Report and the European Search Opinion Dated Oct. 1, 2012 From the European Patent Office Re. Application No. 12172576.6.

(Continued)

*Primary Examiner* — Sath V Perungavoor
*Assistant Examiner* — Jeffery Williams

(57) ABSTRACT

Autostereoscopic systems permitting various degrees of free movement of a viewer are provided. Some embodiments incorporate both a light-controlling module which provides for autostereoscopic viewing, and a lenticular array distinct from that module, which enhances movement permissiveness of the system. Some embodiments provide an eye-position detector and means to aim light of left and right stereoscopic images appropriately towards a viewer's left and right eyes respectively.

19 Claims, 12 Drawing Sheets

(56) References Cited

U.S. PATENT DOCUMENTS

| | | | |
|---|---|---|---|
| 5,956,001 A | 9/1999 | Sumida et al. | |
| 6,703,989 B1 * | 3/2004 | Harrold et al. | 345/32 |
| 7,190,518 B1 * | 3/2007 | Kleinberger et al. | 359/465 |

FOREIGN PATENT DOCUMENTS

| | | |
|---|---|---|
| JP | 08-146346 | 6/1996 |
| JP | 09-043540 | 2/1997 |
| JP | 10-206795 | 8/1998 |
| JP | 10-253926 | 9/1998 |
| JP | 2003-202517 | 7/2003 |
| JP | 2003-202519 | 7/2003 |
| JP | 2005-010303 | 1/2005 |
| WO | WO 97/26577 | 7/1997 |
| WO | WO 98/49837 | 11/1998 |
| WO | WO 01/18589 | 3/2001 |
| WO | WO 2009/130699 | 10/2009 |

OTHER PUBLICATIONS

Communication Relating to the Results of the Partial International Search Dated Aug. 11, 2009 From the International Searching Authority Re.: Application No. PCT/IL2009/000438.

Communication Under Rule 71(3) EPC Dated Dec. 6, 2011 From the European Patent Office Re. Application No. 09735066.4.

International Preliminary Report on Patentability Dated Jul. 23, 2010 From the International Preliminary Examining Authority Re.: Application No. PCT/IL2009/000438.

International Search Report and the Written Opinion Dated Oct. 16, 2009 From the International Searching Authority Re.: Application No. PCT/IL2009/000438.

Response Dated Feb. 18, 2010 to the Written Opinion of Oct. 16, 2009 From the International Searching Authority Re.: Application No. PCT/IL2009/000438.

Notice of Rejection issued on Japanese application 2011-505638, mailed Dec. 16, 2013. (English translation not available).

* cited by examiner

TIME 1

TIME 2

POSITION-PERMISSIVE AUTOSTEREOSCOPIC DISPLAY SYSTEMS AND METHODS

RELATED APPLICATIONS

This application is a U.S. national stage application claiming the benefit of International Application No. PCT/IL2009/000438, filed on Apr. 22, 2009, which claims the benefit of U.S. Provisional Application 61/071,314, filed Apr. 22, 2008, the entire contents of which are incorporated herein by reference.

FIELD AND BACKGROUND OF THE INVENTION

The present invention, in some embodiments thereof, relates to systems and methods for displaying stereoscopic image pairs viewable by a viewer without need of eyeglasses. Stereoscopic viewing without need of special eyeglasses is referred to as "autostereoscopy" herein.

Two well-known technologies, known as "lenticular" display systems and "parallax barrier" display systems, produce autostereoscopy by displaying left-image pixels (i.e. pixels intended for viewing by a left eye) on first stripes of a displayed image (usually, but not necessarily, vertical stripes) and reproducing right-image pixels (i.e. pixels intended for viewing by a right eye) on second stripes of that displayed image. In both technologies first and second stripes alternate with each other across the displayed image. Additional stripes from additional image views are also interleaved in some cases. In parallax barrier systems opaque portions of a barrier appropriately distanced from the display prevent the viewer's left eye from seeing the right-image pixels and prevent his right eye from seeing the left-image pixels. In lenticular systems, lenticles (micro-lenses) accomplish the same purpose by directing a viewer's left eye view toward left image pixels and preventing his left eye from viewing of right-image pixels, and directing his right eye's view towards right-image pixels and preventing it from viewing left-image pixels.

Such autostereoscopic systems may be contrasted with stereoscopic display technologies which do depend on use of eyeglasses. Some of these, called image-sequential systems, are designed to produce, in rapid sequence, a full-resolution left image (i.e. an image intended for viewing by a viewer's left eye), and then subsequently a full-resolution right image intended for viewing by the viewer's right eye. In some systems, "shutter glasses", eyeglasses with small LCD eye windows which switch rapidly between being transparent and being opaque, are used to block the left eye when the right image is being displayed and block the right eye when the left image is being displayed. In other systems, where what are called "passive" polarizing glasses are used, left images are displayed polarized in a first orientation N°, and right images are display polarized in a second orientation, typically orthogonal to the first orientation, i.e. (N+90)°. As with the shutter-glass systems, alternation of images repeats rapidly and continuously, with left images alternating with right images many times a second. The viewer uses passive polarizing eyeglasses, so that his left eye has a polarizing filter in front of it in the first orientation, and his right eye has a polarizing filter in front of it in the second orientation. Through the filters, the left eye sees only the left images and the right eye sees only the right images.

PCT application WO97/026577 by Kleinberger et al. (referred to in the following as "PCTA",) teaches inter alia a system whereby at a given time, one of a pair of stereoscopic images is displayed on all or part of a display in a format wherein first stripes reproducing pixels of that image are displayed in a first polarization orientation and second stripes reproducing pixels of that same image are simultaneously displayed in a second polarization orientation. A selective light-blocking layer interposed between display and viewer and comprising striped portions blocking light in the first orientation alternating with striped portions blocking light in the second orientation can be used to display light of the selected image (one image of a stereoscopic pair of images) to one viewer eye while preventing it being seen by the viewer's other eye. PCTA teaches use of this structure to provide full-resolution autostereoscopic viewing.

PCTA presents various other features and methods for stereoscopic and autostereoscopic system which aid in understanding some of the embodiments presented herein. The reader is referred in particular to discussions of movement permissiveness of autostereoscopic systems presented therein, and to discussions of configurations combining color filters to achieve autostereoscopy.

PCT Application WO01/18589 by Kleinberger et al. (referred to in the following as "PCTB"), and also U.S. Pat. No. 5,629,798 to Gaudreau, teach inter alia a full resolution display system in which left and right images are displayed simultaneously on all pixels of a display, each physical display pixel emitting light polarized in a first orientation and corresponding in intensity to a left image pixel at that position, and also simultaneously emitting light polarized in a second orientation orthogonal to the first, and corresponding in intensity to a right-eye image pixel at that position. A display screen of this design is referred to in this document as a "G Screen". Kleinberger et al and Gaudreau teach use of eyeglasses having polarizing filters in front of each eye to transmit only left image light to the left eye and only right image light to the right eye, resulting in stereoscopic viewing.

PCTB also teaches organizing the image output of a G Screen in such a way that first sections alternate with second sections across the screen (a section being, for example, a vertical column of pixels one or several pixels wide), such that in first sections the left image is polarized in a first orientation and the right image in a second orientation, and in second sections the left image is polarized in the second orientation and the right image in the first orientation. PCTB shows how this display light can be viewed through a light-blocking layer implemented as a formatted polarizing filter near the display and having striped polarizing filters in alternating orientations, to enable full-resolution autostereoscopic viewing of both images simultaneously.

Contents of the above-referenced documents are hereby incorporated herein by reference.

SUMMARY OF THE INVENTION

The present invention, in some embodiments thereof, relates to a systems and methods for displaying stereoscopic image pairs viewable by a viewer without need of eyeglasses. Some embodiments combine a display, a light-controlling module which in itself provides for autostereoscopic viewing by directing left image elements only to a viewer's left eye and right image elements only to a viewer's right eye, and a lenticular array which serves to enable some freedom of movement of a viewer as he views, through the light-controlling module, a stereoscopic image pair displayed on the display. Some embodiments comprise a module for detecting and tracking positions of a viewer's eyes, and for modifying the position or configuration of components of the display or of the light-controlling module in order to direct left image light to a viewing zone which includes a detected position of a viewer's left eye and to direct right image light to a viewing zone which includes a detected position of a viewer's right eye. Permissiveness provided by the lenticular array enables use of highly simplified and relatively inexpensive aiming systems to aim appropriate images towards each eye of the viewer. In some embodiments the light-controlling module comprises polarizing filter elements and/or birefringent elements. The birefringent elements may be switchable under electronic control. In some embodiments the light-controlling module comprises color filter elements.

According to an aspect of some embodiments of the present invention there is provided an autostereoscopic display system which comprises a) a display for displaying at least portions of a left image and of a right image which together comprise a stereoscopic image pair;

b) a light-controlling module for directing light of the displayed left image portions towards a viewer's left eye and for directing light of the displayed right image portions towards a viewer's right eye when the module is positioned between the display and a viewer and closer to the display than to the viewer; and c) a lenticular array distinct from the light-controlling module which serves to broaden viewing zones within which the viewer's eyes can move while continuing to see only appropriate image light from the display.

According to some embodiments of the invention, the lenticular array serves to concentrate light into central portions of pixels of the display.

According to some embodiments of the invention, the light-controlling module comprises a filter serving to block polarized light, and the lenticular array is proximate to the filter.

According to some embodiments of the invention, the system further comprises an eye-position detection module for detecting positions of eyes of a viewer.

According to some embodiments of the invention, the light-controlling module comprises electronically switchable birefringent subsections and a controller which uses eye position information detected by the eye position detection module to calculate which combination of neighboring subsections are to be switched to same states of birefringence in order to aim viewing zones towards detected positions of viewer's eyes.

According to some embodiments of the invention, the system further comprises a mechanical device for moving one component of the system with respect to another in response to eye-position information detected by the eye-position detection module.

According to some embodiments of the invention, the light-controlling module comprises a two layer filter, each layer of which comprises multiple first and second polarizing filter segments, the first and second segments having orthogonal polarization orientations, the first and second segments being alternatingly positioned across the first and along the second filter layers.

According to some embodiments of the invention, the light-controlling module comprises a first filter which comprises multiple first and second segments alternatingly positioned across the first filter, the first and second segments having birefringence characteristics such that polarization orientation of polarized light passing through the first segments is rotated approximately 90° more than polarized light passing through the second segments.

According to some embodiments of the invention, the light-controlling module further comprises a second filter which comprises multiple first and second filter segments which filter polarized light, the first segments of the second filter having a polarization orientation orthogonal to that of the second segments of the second filter, the first and second segments being alternatingly positioned across the second filter.

According to some embodiments of the invention, one of the filters comprises a birefringent element whose birefringence is switchable under electronic control.

According to some embodiments of the invention, the light-controlling module comprises a filter passing light in first color ranges and blocking light in second color ranges.

According to some embodiments of the invention, the filter comprises first and second sections alternatingly positioned across the filter, the first sections passing light in a first set of color ranges and blocking light in a second set of color ranges, the second sections passing light in the second set of color ranges and blocking light in the first set of color ranges.

According to some embodiments of the invention, the system comprises a mechanism for selectively illuminating first positions or second positions within the device, selection being based on information detected by the eye-position detection module.

According to some embodiments of the invention, the system comprises a component operable to be positioned at one of two possible positions, a mechanism for positioning the component at one of the two possible positions, and a controller for selecting one of the two possible positions based on information supplied by the eye-position detection module.

According to some embodiments of the invention, the system further comprises a controller operable to select one of two possible display modes depending on information supplied by the eye-position detection module.

According to some embodiments of the invention, the controller is further operable to command a configuration change when information supplied by the eye-position detection module shows that a viewer's eye is near a border of a viewing zone.

According to some embodiments of the invention, the configuration change comprises a switching of a component having electronically controllable birefringence.

According to some embodiments of the invention, the configuration change comprises mechanical movement of a component of the system.

According to an aspect of some embodiments of the present invention there is provided a system for autostereoscopic display, comprising a display operable to display in multiple first segments portions of a left image in a first set of colors and portions of a right image in a second set of colors and to display in multiple second segments portions of the right image in the second set of colors and portions of the left image in the first set of colors, the first and second segments being alternatingly positioned across the display.

According to some embodiments of the invention, the system further comprises a color filter layer positioned between a viewer and the display, the filter layer comprising first and second segments alternatingly positioned across the layer, the first segments of the layer passing the first set of colors and blocking the second set of colors and the second segments passing the second set of colors and blocking the first set of colors.

According to some embodiments of the invention, the system further comprises a lenticular array.

According to some embodiments of the invention, the display comprises a lenticular array.

According to some embodiments of the invention, the system comprises a lenticular array proximate to the filter.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
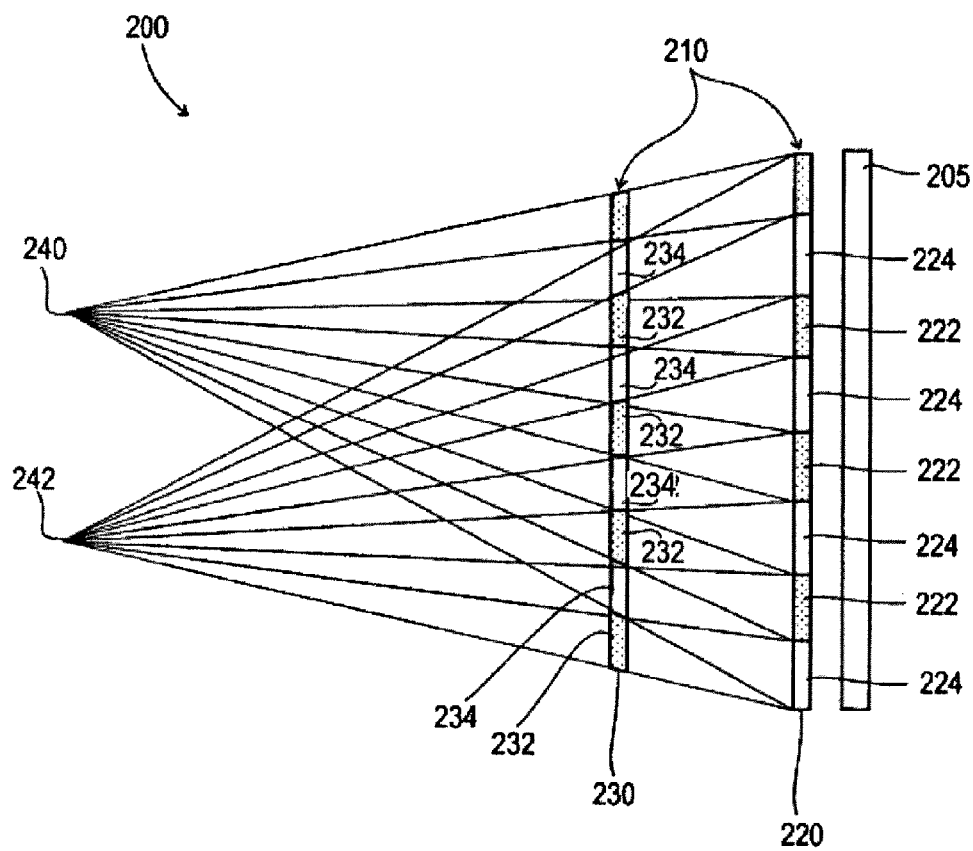
FIG. 1 is a simplified schematic presenting components common to various embodiments of the present invention.

The present invention, in some embodiments thereof, relates to autostereoscopic display systems, and more particularly, but not exclusively, to autostereoscopic display systems which provide some freedom of movement to a viewer while the viewer is using the system to view a stereoscopic image.

In this document the general term "stereoscopic", refers to the visual experience when a viewer's left eye sees a left image showing a scene, and his right eye sees a right image showing a similar scene presented as if from a slightly different perspective, resulting in an experience of depth perception. The term "stereoscopic image pair" is used herein to refer to a pair of images such that when a first image of the pair is viewed by a viewer's left eye and a second image of the pair is viewed by a viewer's right eye, either simultaneously or in a rapidly alternating sequence of images or parts of images, a viewing experience simulating depth perception results. It is noted, however, that the systems and methods disclosed herein may be used to effect simultaneous or near simultaneous viewing of pairs of images, one to each eye, for any other purpose. The term "stereoscopic image pair" as used herein is to be understood to include pairs of images presented for viewing with one image intended for each eye, even if the pair of images do not contain stereoscopic views of a same scene.

The terms "left image" and "right image" are used to refer to left and right images of a stereoscopic image pair, unless otherwise stated. The term "appropriate image" is used to refer, for a given eye, to that image of a stereoscopic pair of images, which, when that eye views it, enables stereoscopic viewing. In other words, the left image of the stereoscopic pair is the "appropriate image" for the left eye, and right image of the stereoscopic pair is the appropriate image for the right eye. Similarly, the term "appropriate eye" refers to the left eye, when viewing the left image of a stereoscopic image pair, and to the right eye with respect to viewing the right image of a stereoscopic image pair.

Notwithstanding the general definition of "stereoscopic" given above, it is noted that the term "stereoscopic", when used herein to refer to a type of display or display system, should be understood to refer to a display which requires eyeglasses to be worn by a viewer, and is distinguished from systems termed "autostereoscopic", which produce the stereoscopic visual depth-perception experience without requiring the viewer to wear eyeglasses.

Some embodiments described in detail below combine a display for providing picture elements of left and right images of a stereoscopic image pair, a light-controlling module which enables left image elements to reach only a viewer's left eye and which enables right image elements to reach only the viewer's right eye, and a lenticular array. In some embodiments a lenticular array is used in conjunction with a first light-controlling configuration to provide a broad viewing zone within which a viewer's eyes are free to move without his movement thereby substantially affecting his viewing of stereoscopic image pairs presented by the apparatus. It is to be noted that this use of lenticular arrays is essentially different from the 'classical' use of lens arrays for autostereoscopy as described in the background section above. Lenticular arrays used according to prior art cause each of a viewer's eyes to see alternate columns of pixels, to some columns visible to one eye and some to the other. In embodiments of the present invention lenticular arrays are used to provide a broadened viewing zone (and consequent freedom of movement for a viewer), in an apparatus wherein limitation of left image light to the viewer's left eye and limitation of right image light to the viewer's right eye is provided by a distinct additional light-control module. In some embodiments that light-control module, while controlling which image light reaches which eye, nevertheless enables each eye to see (either simultaneously or in rapid temporal alternation) light from all pixels of the display, and the included lenticular arrays are designed to enable this.

Some embodiments presented below comprise a module for detecting and tracking positions of a viewer's eyes, and for modifying components of the display and/or the light-controlling module in order to direct left image light to a viewing zone which includes a detected position of a viewer's left eye and to direct right image light to a viewing zone which includes a detected position of a viewer's right eye.

In some embodiments the light-controlling module comprises polarizing filter elements and may comprise birefringent elements, which may be switchable under electronic control. In some embodiments the first configuration comprises color filter elements.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Two-Layer Formatted Polarizing Filter:

Referring now to the drawings, FIG. 1 is a simplified schematic presenting a system 200 comprising components common to various embodiments of the present invention. FIG. 1 is similar to FIGS. 6-11 of PCTA, and the reader is referred to that document which presents a variety of configurations of, and uses for, a family of similar structures, all of which may be used with additional elements, as presented hereinbelow, to form embodiments of the present invention.

FIG. 1 presents an autostereoscopic display system 200 which comprises a display 205 and a two-layer light-conditioning filter 210 which comprises a first filter 220 and a second filter 230. In FIG. 1 apparatus 200 is seen from above, and it is to be understood that a viewer's left-eye is positioned at position 240 and his right eye at position 242. Two-layer light-conditioning filter 210 is also referred to herein as "two-layer filter" 210 and "combined filter" 210. Two-layer filter 210 is an embodiment of a "light-controlling module", as that term is used herein and in the appended claims.

First filter 220 and second filter 230 are polarizing filter surfaces, appearing as lines on the drawing because they are shown as if seen from above. Both first and second filters are two-dimensional surfaces subdivided into sections (e.g. vertical columns) of alternating types. Eight sections are shown on each filter in this simplified drawing. Hundreds or thousands of sections might be appropriate for a practical embodiment.

Shaded rectangles 222 and 232 are polarizing filter sections (optionally, embodied as vertical columns) oriented in a first direction N°.

Clear rectangles 224 and 234 are polarizing filter sections with polarization orientation in a second direction, perpendicular to the first, (N+90)°.

Note that in this document the term "polarization orientation" and references to e.g. first and second polarization orientations are to be understood to refer to any type of conditioning of light by polarization filtration and/or filtration together with controlled degrees of retardation. Thus "first and second polarization orientations" could be linear polarizations in first and second orthogonal orientations, but these terms are also to be understood to include distinct first and second orientations of linear and/or circular and/or elliptically polarized light.

In some embodiments combined filter 210 comprises two parallel surfaces large enough to cover a display screen 205, each surface having sections (222,224,232,234) each of which has a polarization orientation perpendicular to that of its neighbor. Optionally, these sections are embodied as vertical columns. If the display is wider than the distance between the viewer's eyes, columns on second filter 230 are slightly narrower than those on first filter 220, as can be seen from the drawing. Note that in the embodiment shown in FIG. 1 no part of filters 220 and 230 is opaque in itself: that fact helps distinguish system 200 from the parallax barriers of prior art.

If the reader anchors the end of a straightedge on the position of the left eye in the Figure, and causes the free end of the straightedge to move from top to bottom of the drawing, he will observe that all lines of sight from the left eye towards the image display encounter a portion of the "two-layer polarizing filter" which is everywhere transparent, because along all lines of sight from left eye to display surface, the polarizing sections of the first and second filters agree with each other, and polarizers which agree with each other are relatively transparent. Therefore a viewer's left eye, at position 240, can see all of display 205. On the other hand, use of the straightedge anchored to the right eye position 242 will demonstrate that every line of sight from the right eye towards display 205 is blocked, because along those lines of sight the first and second filters everywhere disagree, making their combination substantially opaque.

The configuration presented by FIG. 1 can be used alone or with various additional components to provide autostereoscopic viewing, as will be explained below.

Figure 2:
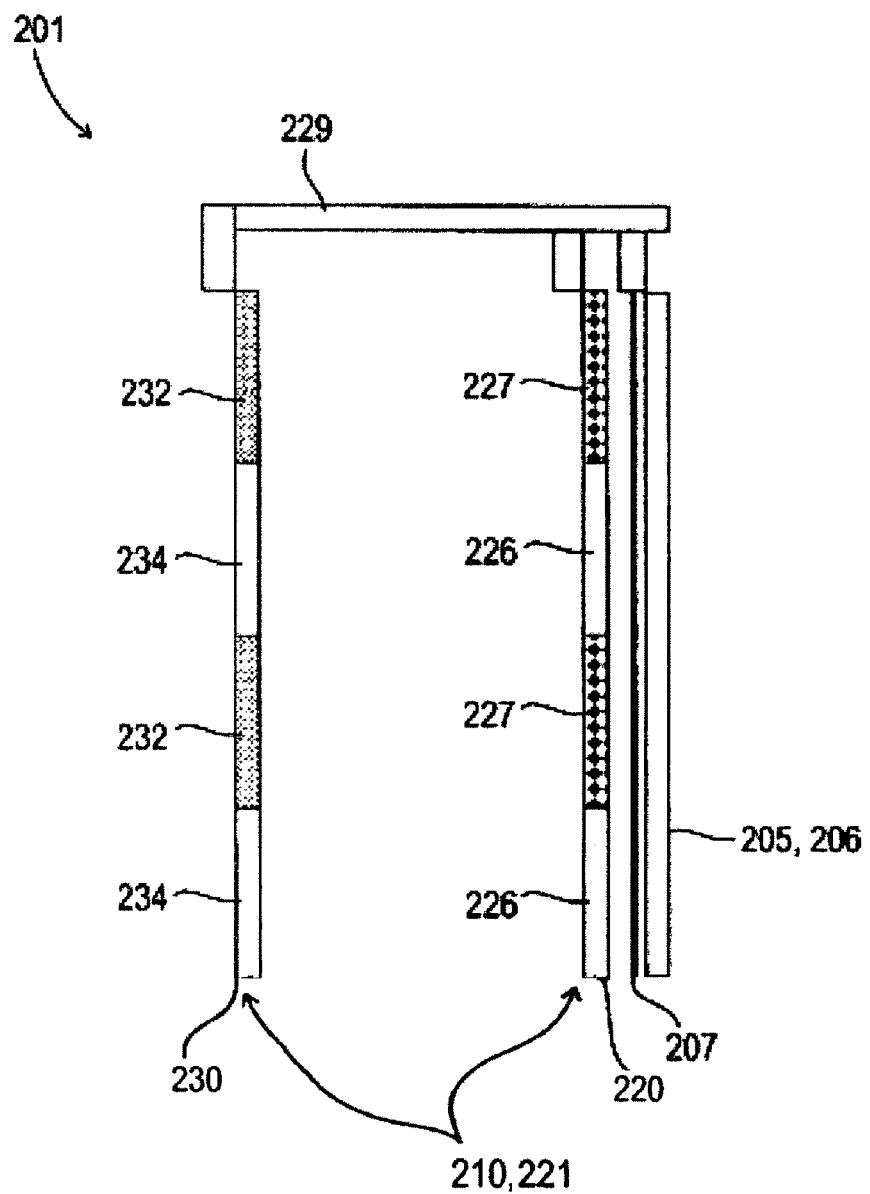
FIG. 2 is a simplified schematic of an alternative configuration of a two-layer filter, according to an embodiment of the present invention.

Alternative Configuration of Two-Layer Filter, for use with Polarizing Displays:

Attention is now drawn to FIG. 2, which is a simplified schematic of a system 201 comprising an alternative configuration of a two-layer filter, according to an embodiment of the present invention.

FIG. 2 presents an embodiment of the two-layer filter particularly useful when display 205 is a display 206 emitting polarized light. Some displays, for example LCD screens, intrinsically emit polarized light. DLP displays used for stereoscopic (with glasses) "3D" display incorporate polarizing filters in the display's internal light path. Non-polarizing displays 205 (e.g. CRT, plasma, OLED) can be made into polarizing displays by passing their output light through an optional polarizing filter 207.

FIG. 2 presents a system 201 wherein a display emitting polarized light 206 (optionally a display emitting non-polarized light 205 combined with a polarizer 207) is used in conjunction with an alternative configuration of two-layer filter 210, here labeled 221.

In system 201, first layer 220 comprises alternating sections (optionally embodied as vertical columns) of differing degrees of birefringence: second sections 227 turn light 90° more than first sections 226. (For clarity, only a few sections are shown; in practice, hundreds or thousands would usually be used.) Polarized light enters from display 206, which may be a non-polarizing display 205 plus optional polarizer 207. Light reaching first filter 220 is uniformly polarized, but is delayed more by relatively more birefringent sections 227 of filter 220 than by relatively less birefringent portions 226. The degrees of birefringence of sections 226 and 227 are selected to result in a rotational difference of 90° between light passing first sections 226 and light passing second sections 227. The size, positions, and birefringence of the alternating first and second sections is so selected and configured that light traversing first layer 220 is conditioned similarly to light passed through first layer filter 220 of FIG. 1, as discussed above. (Indeed, one way to construct first filter 220 of FIG. 1 is to marry a uniform polarizer to an alternatingly birefringent strip, as shown in FIG. 2.)

The configuration presented in FIG. 2 is also considered a "two-layer filter" and "combined filter", as those terms are used herein.

The configuration of system 200 is useful for providing autostereoscopic viewing of a non-polarizing display, and the configuration of FIG. 2 is useful for producing autostereoscopic viewing of a polarizing display. Several methods for doing so will now be described.

Autostereoscopic Viewing using Two-Layer Filter:

The configuration shown in FIG. 1 permits one eye to see display 205, and prevents the second eye from seeing the display. Introduction of a polarization-switching element into system 200 or 201 enables full-resolution image-sequential autostereoscopic viewing. One way of doing this is presented in PCTA, where a switchable birefringent element is used to cause a rapid alternation of the polarization orientation of light moving through it. In a prototype a PI-cell was positioned between the first and second filters, to rapidly and periodically reverse the effect of the two-filter combination, thereby rapidly switching between a first mode where a left eye can see the screen and a right eye is blocked from seeing the screen (as shown in FIG. 1) to a second mode where the right eye can see the screen and the left eye is blocked. A controller and switching mechanism switched between making the filter pair transparent to the left eye and making the filter pair transparent to the right eye. This was done in coordination with switching between displaying a left image on display 205 and displaying a right image on display 205.

Switching was done at speeds so fast the "persistence of vision" phenomenon well known to students of human vision causes each eye to have the impression that it is seeing a continuous image. In some embodiments, left images and right images are seen at full resolution because each eye, when it sees the screen, sees all of the screen, sees all pixels of the display. This situation is in conformity with the image-sequential encoding formats which are popular in the 3D industry because they are compatible with several types of polarizing eyeglasses for stereoscopic viewing (e.g. passive polarizing glasses and more particularly shutter glasses).

Alternative arrangements of polarizing sections, described in PCTA, provide for alternation between a first mode in which first portions if both images are presented to both eyes, each to the appropriate eye, and a second mode in which second portions of both images are presented to both eyes, each to the appropriate eye.

The two-layer filtering process can be used with a variety of display types. Inter alia, the two-layer filter will provide autostereoscopic viewing for display types adapted to provide stereoscopic viewing using special eyeglasses, where the combined filter replaces the eyeglasses.

Working with Various Contemporary Display Types

Arrangements whereby left-eye images are provided in a first polarization orientation and right-eye images are provided in an orthogonal polarization orientation, or other arrangements providing temporal alternation of image portions as taught by PCTA, can be provided by several types of industry-standard displays. Various types of displays rapidly flip between left-eye images polarized one way and right-eye images polarized another way and provide 3D viewing to viewers wearing passive polarizing eyeglasses. Here are some examples:

DLP displays (e.g. "3D ready" televisions sold by Samsung) are back projections systems based on the DLP digital mirror chips made by Texas Instruments. The displays work by projecting a beam of light onto the DLP mirror, whence it is reflected onto a back projection screen. In "3D Ready" DLP televisions (e.g. those sold by Samsung and Mitsubishi), polarization of the light beam is switched in synchronization with rapid switching of left-eye and right-eye picture elements being used to control a DLP mirror. A viewer wearing polarizing filter eyeglasses sees right-eye picture elements in rapid sequence in his right eye and left-eye pictures elements in rapid sequence in his left eye, thereby creating what appears to be (because of persistence of vision) full-time full-resolution stereoscopic vision.

Fast liquid crystal displays use fast-switching (e.g. 120 Hz) liquid crystals and are able to switch rapidly enough to provide 3D displays when coordinated with shutter glasses. It is possible to provide such a display with an additional liquid crystal layer which rapidly flips polarization orientation of the outgoing light of the entire screen by 90°, and does so at a rapid rate synchronized with the presentation of the left and right images on the screen, so that each eye's image is always shown with a same polarization orientation. Passive polarizing eyeglasses can then be used to see the stereoscopic images. In this manner a fast (e.g. 120 Hz) liquid crystal layer (or PI screen, or ferroelectric layer, or other) can be used to rapidly switch orientations of light from any polarized display. Moreover, any non-polarized display (e.g. Plasma, OLED, CRT) can be turned into a polarizing display by putting a polarizing filter in front of it. Thus, any display combination that provides 3D viewing to a viewer wearing passive polarizing 3D glasses can serve as image source for the display apparatus shown in FIG. 2. Moreover, any display that works with "shutter glasses" (a popular 3D viewing tool which uses an LCD effect to rapidly switch each eyepiece between opaque and transparent) can be passed through a polarizing filter and polarization switching 'flipper' layer as described above.

Polarscreens® Displays

This is the display described in FIGS. 14-18 of PCTB and (earlier) by Jean Gaudreau, whose U.S. Patent is cited in the background section above. This display is able to show both a full-resolution left-eye image in a first polarization orientation and a full-resolution right-eye image in a second (orthogonal) polarization, simultaneously. It requires for its construction a first-layer screen, which can be an LCD display or other type of display, and a second layer which is an LCD array. The first screen creates an image which combines the light intensity of the left image pixel with the light intensity of the right image pixel, for each pixel position of the display. The second layer re-divides the light of each pixel into a left-image portion polarized in a left-image polarization orientation and a right-image portion polarized in an orthogonal right-image polarization orientation. For further details the reader is referred to PCTB and the Gaudreau patent cited above.

Screens based on these principles are referred to as the "G Screen" in this document.

Gaudreau's patent describes use of the display with passive polarizing glasses, where it provides a full-resolution stereoscopic display with no switching or flickering. PCTB describe use of a screen similar to that described by Gaudreau, to make an autostereoscopic device.

Adding Autostereoscopic (without Glasses) Capabilities to Stereoscopic (with Glasses) Displays As discussed above with reference to FIGS. 1 and 2, if image light from a display is uniformly polarized and viewed through the filter of FIG. 2, then if dimensions of the device and eye positions of the viewer are correctly selected and the filters of the two-layer filter device are coordinated with the conditioning of the light emitted by the display, then that light will be visible to one of the viewer's eyes and be blocked from his other eye as shown in FIG. 1.

If the display is a fast-switching display which switches polarization when it switches images, then configuration shown in FIG. 2 will alternatingly transmit the left image only to the left eye, and transmit the right image only to the right eye.

If the display is a G Screen, left and right images are presented in orthogonal polarizations simultaneously. Consequently use of the G Screen as the display in the configuration of FIG. 2 results in transmitting a full-resolution left image to the left eye and a full resolution right image to the right eye simultaneously and continuously.

The two-layer filtering configuration can advantageously be manufactured together with the display, with polarizing region borders coinciding with the pixilated structure of a pixilated display. However for some applications it will be advantageous to provide the two-layer filter configuration as a stand-alone combined filter comprising the two filters in a rigid structure which spaces them apart appropriately, as shown in FIG. 2. So constructed, the combined filter can be independent of the display, and be placed in front of the display, or removed, as desired. In a further alternative embodiment, the alternatingly birefringent first layer can be permanently fixed to the display, and the second layer be made to be attachable and removable. (If the filter is constructed independent of the display, it may be found preferable to avoid element dimensioning of the filter which is different from but very similar to that of the pixilated structure of the display, as similar dimensioning is likely to create Moire patterns when filter and pixilated display are used together.)

Note that removing the combined filter is not generally required to enable 2D viewing on a 3D-capable display equipped with the combined filter. Lenticular and parallax barrier systems now sold require electronic systems to turn on and off the parallax barriers or to create or eliminate the lenticular array, because those systems are intrinsically half resolution systems, so ways must be found to display 3D at half resolution but display 2D at full resolution. Since the present system is intrinsically full resolution it suffices to use the existing 3D display capability to show the same image to both eyes, which can then view the 2D image through the double-filter configuration without interference and from any viewing position.

One-Layer Configurations

One Filter Layer used with G Screen

Figure 3:
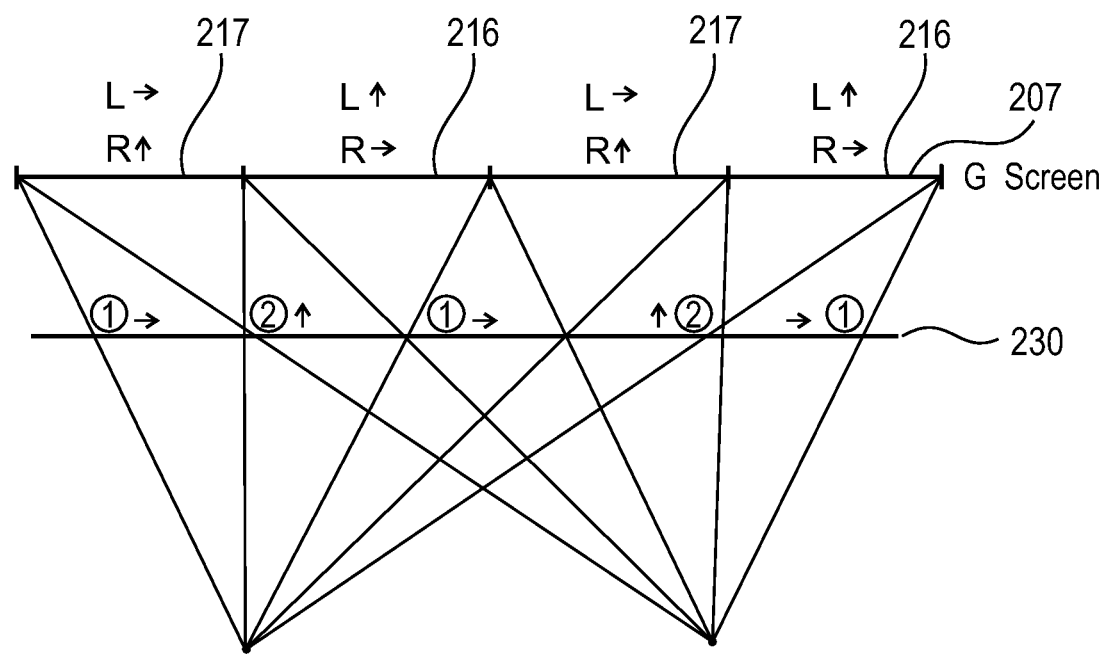
FIG. 3 is a simplified schematic of an embodiment comprising a screen able to show left and right images simultaneously on each pixel, according to an embodiment of the present invention.

Attention is now drawn to FIG. 3, which is a simplified schematic of an embodiment where at least some display pixels show light of both left and right images simultaneously, according to an embodiment of the present invention. One implementation of this embodiment uses the G Screen. Another implementation uses a multicolor image source (e.g. a DLP projector) and color filtration.

Considering first the G Screen implementation, it may be seen from the Figure that the G Screen itself can play the role of the first layer of the two-layer filter, because selective image modification is done directly by the G screen itself.

G Screen 207 may be thought of as divided into sections, for example vertical pixel columns one or more pixels wide, first sections 216 alternating with second sections 217 across the screen. (For simplicity, the principle is here shown in a highly simplified version with only four screen sections shown on the Figure.) In first sections 216, the screen drivers display left image light in a first orientation and right image light in a second orientation. In second sections 217 the opposite is the case, left image light is displayed in the second orientation and right image light in the first orientation. In the simplified example shown in FIG. 3, sections 217 have right-eye light oriented as shown by the up arrow, and left-eye light oriented as shown by the sideways arrow, while sections 216 have left-eye light marked with the up arrow and right-eye light with the side arrow. (These arrows represent any pair of orthogonal orientations.) Filter layer 230 of FIG. 3 is defined as was layer 230 of FIG. 1, with orientations as shown by the arrows marked '1' and '2'. According to the method explained in the discussion of FIG. 1, the left eye sees only the left-eye light which is hidden from the right eye. However, since each section displays light from both images, in orthogonal polarization orientations, it is also the case that the right eye sees the right-eye light, which is hidden from the left eye. Thus, each eye sees its appropriate image light, simultaneously and on all pixels of the screen.

Filter Layer using Color Filtration, and Images Combining Two Sets of Color Ranges FIG. 3 also represents a display system in which color filtration rather than polarization filtration is used. In traditional anaglyph 3D viewing, one lens of a pair of eyeglass lenses passed one color range (e.g. red) and the second lens passed a second color range (e.g. green), the two color ranges being mutually exclusive. In a relatively recent development, DOLBY® 3D movies, now showing in movie theatres, use a color filtration eyeglass system in which the color filter in the left lens of the eyeglasses passes a first set of color ranges (e.g. a set including red, green, and blue) and the color filter in the right lens passes a second set of color ranges (e.g. a set including colors similar to, but different from, the colors of the first set, e.g. orange, aquamarine, etc.), the first and second sets of color ranges being mutually exclusive. In this manner each eye sees a colored image, the images tinted slightly differently, but each appearing to the viewer as a full-color image. A left image is projected in the first set of color ranges and a right image simultaneously projected in a second set of color ranges. Color filtration eyeglasses pass light in the first set of color ranges to the left eye and pass light in the second set of color ranges to the right eye, and stereoscopic viewing results.

The same or any similar color filtration technology can be used in a light-controlling module such as that shown in FIG. 3, to produce autostereoscopic viewing. In place of first and second polarization orientations, first and second sets of color ranges are used. Thus, left image light is displayed by (or projected onto) sections 217 in a first set of colors, and left image light is shown in sections 216 in a second set of colors, while (alternatingly or simultaneously) right image light is shown in sections 217 in the second set of colors and in sections 216 in the first set of colors. Filter 230 then comprises first filter sections, marked (1) in FIG. 3, which pass only the first set of colors, and second filter sections marked (2) in the Figure, which pass only the second set of colors. For the reasons explained above with respect to polarization filtration, the viewer's left eye will then see left image light and only left image light on all parts of the display, and the viewer's right eye will see right image light and only right image light on all parts of the display. (Devices and methods enabling the viewer to move somewhat while still seeing only appropriate light, presented below particularly with reference to FIGS. 7-9, may be used with the configurations of FIG. 3 to enhance movement-permissiveness of the system).

One exemplary method for implementing autostereoscopy based on color filtration is to use a DLP projector to project onto a back-projection screen a combined left and right image which combines color ranges according to sections, as described in the preceding paragraph. The colored image projection is sized and aligned so as to be positioned with respect to a filter layer 230 as shown in FIG. 3, enabling autostereoscopic viewing. Methods for facilitating this alignment, and alternative embodiments also using color filtration, are presented below and in FIG. 11.

One Filter Layer used with Fast-switching Screen

An arrangement similar arrangement similar to that described above for the G Screen can work for the fast-switching screens (e.g. DLP and fast LCD displays) as well. This is shown in FIGS. 4A and 4B, which are simplified schematics of first and second composite images, according to an embodiment of the present invention.

Figure 4A:
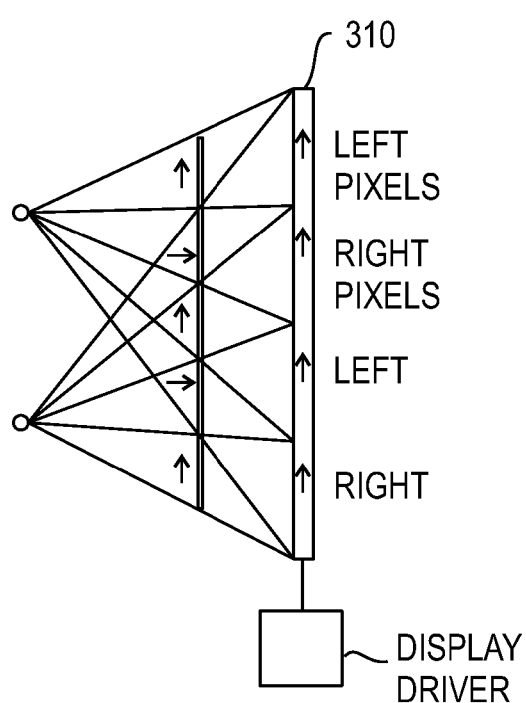
FIGS. 4A and 4B are simplified schematics of first and second composite images, according to an embodiment of the present invention.
Figure 4B:
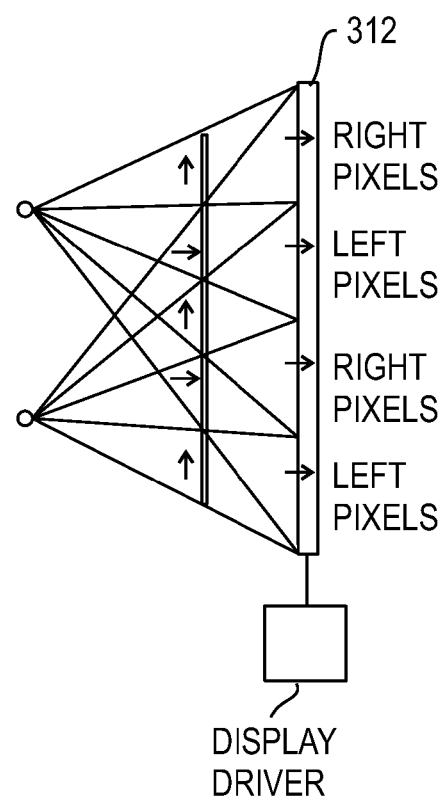

FIGS. 4A and 4B show how to accomplish the same purpose with only a display and a single-layer polarizing filter constructed as described above for the second filter layer. Information from a left-eye image and from a right-eye image is combined to make a first combined image 310 as shown in FIG. 4A and a second combined image 312 as shown in FIG. 4B. Sections (e.g. columns) of left-image pixels alternate with columns of right-image pixels, but the first and second combined images are opposite each other in terms of which image pixels are shown in which positions. Moreover, the first combined image is shown in a first polarization orientation, and the second combined image is shown in a second polarization orientation. This configuration, seen through the second filter by a user appropriately positioned, results in half the left-image pixels being shown to the left eye at time 1 (FIG. 4A) and the other half being shown to the left eye at time 2 (FIG. 4B), and also results in half the right-image pixels being shown to the right eye at time 1 and the other half being shown to the right eye at time 2. Neither eye sees light from the inappropriate image. Fast-switching displays as described above can alternate between a first polarization orientation of the output (as shown in FIG. 4A) and a second polarization orientation of the output as shown in FIG. 4B, while (in synchronization) showing the first combined image alternating with the second combined image. The result, given persistence of vision, is apparent full-resolution autostereoscopic viewing. Thus for example a DLP television projecting the first and second combined images in alternating polarizations, seen through an appropriately spaced-apart and appropriately dimensioned "second filter", will produce autostereoscopic viewing. (In alternative embodiments the DLP television can alternate normal left and right images in alternating polarization orientations, and the 'first layer' of FIG. 2, with alternating birefringence, spaced apart from a 'second layer', will also produce autostereoscopic viewing.)

Aiming the Display

Figure 5:
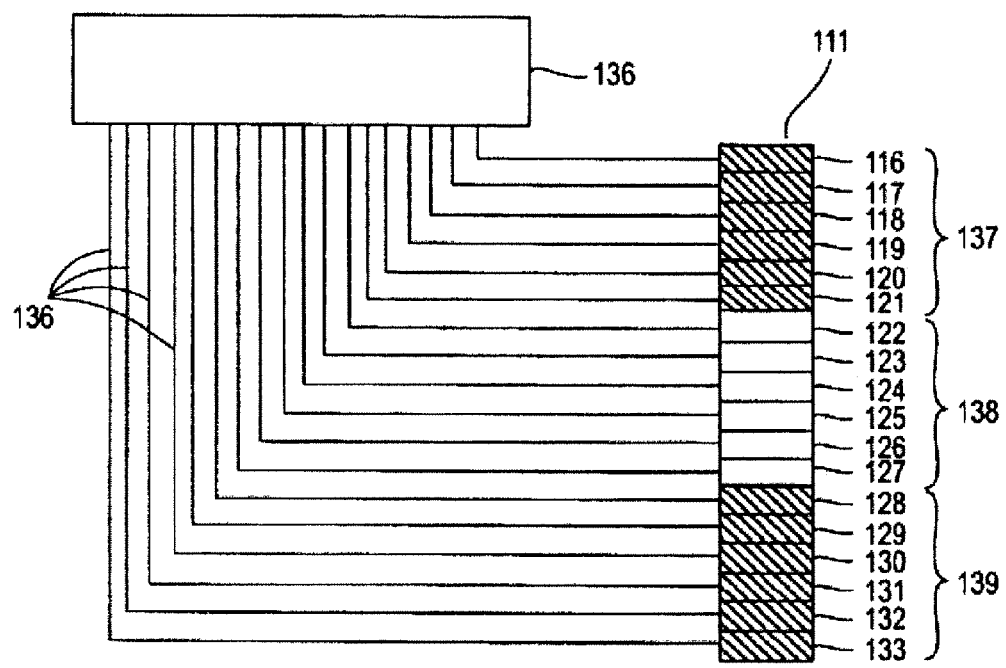
FIG. 5 is a is a simplified schematic of a device for aiming an image toward the eyes of a viewer, according to methods of prior art.

Attention is drawn to FIG. 5, which is a simplified schematic of a device for aiming an image toward the eyes of a viewer, according to methods of prior art. FIG. 5 reproduces FIG. 19 of PCTA, and shows a filter layer having multiple narrow columns whose birefringence is individually switchable. These narrow filter elements can be grouped to create segments formed as the more-birefringent and less-birefringent sections shown in FIG. 2. Alternatively, combining a layer of switchable birefringent elements with a uniform polarizer produces a polarizing filter with switchable elements, which elements can be grouped to form alternating polarizing filter segments as shown as the first layer of FIG. 1 and the second layers of both FIGS. 1 and 2.

PCTA teaches using an eye-tracking module (e.g. a camera and image interpretation software) to locate the positions of the viewer's eyes in three-dimensional space. A controller uses information generated by the eye-tracking module to calculate which small filter columns to switch on and which to switch off, to create a configuration which will aim the left image towards the user's left eye and the right image towards the user's right eye. As shown by FIG. 5, filter columns may be switched on or off in groups to form sections which are collectively more birefringent (e.g. segments 137 and 139) or less birefringent (e.g. segments 138). Turning on elements (e.g. element 122) at one extreme of each such section and turning off an element (e.g. 116, 128) at the other extremes of those sections substantially has the effect of sliding those sections sideways along the width of the filter. If we use the term "viewing field of the eye" to refer to the spatial position (s) from which that eye can see appropriate light (and only appropriate light) from a display, then sliding these sections sideways along the width of the filter has the effect of sliding each eye's viewing field to the left or the right in the space before the display apparatus. In this manner the viewing fields can be moved sideways to include the detected real-time positions of the viewer's two eyes.

Either the first layer of the combined filter, or the second layer, or both, can be provided with this fine electronic aiming control. When both first and second layers have sections which are thus electronically switchable, it is possible to calculate commands which direct left and right eye views to selected points at variable distances as well as at variable left/right displacements with respect to the display, and to accommodate to tilted head positions and non-standard distances between viewers' eyes.

Figure 7:
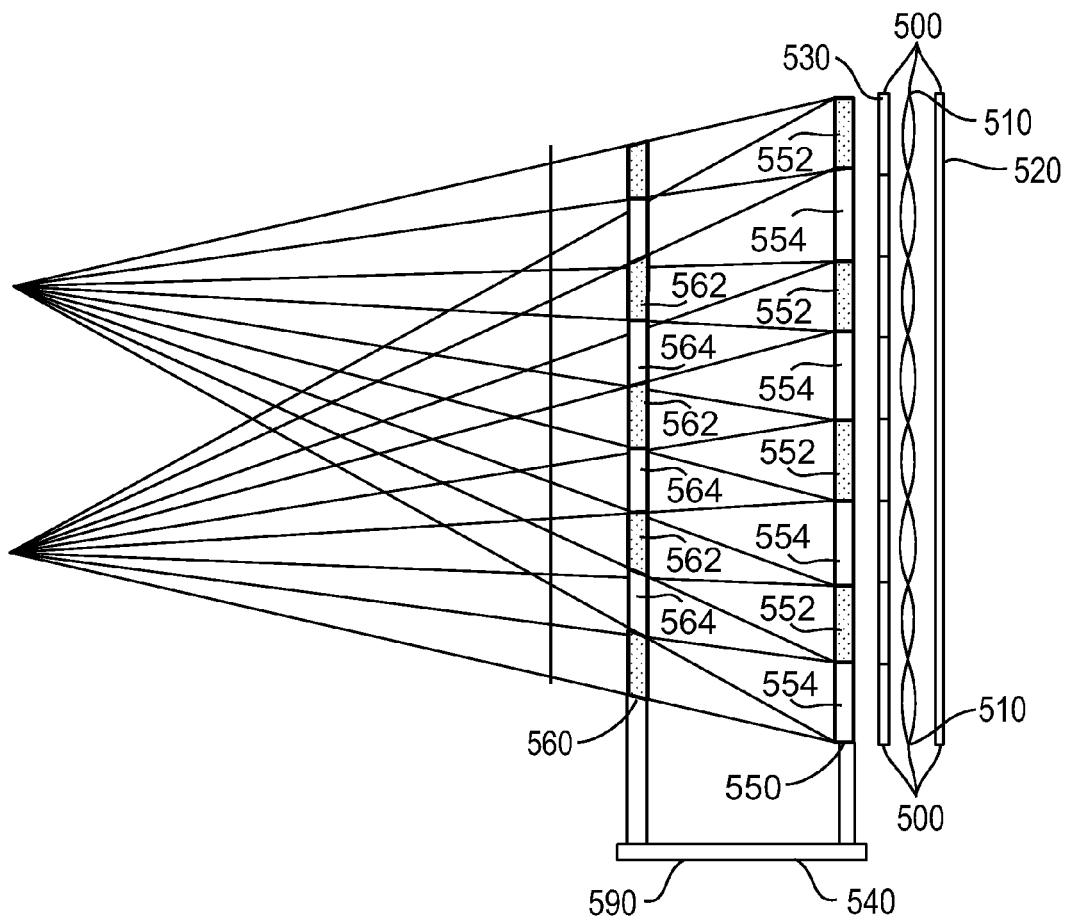
FIG. 7 is a simplified schematic of an autostereoscopic system which achieves movement-permissiveness by pixel-light concentration, according to an embodiment of the present invention.
Figure 8:
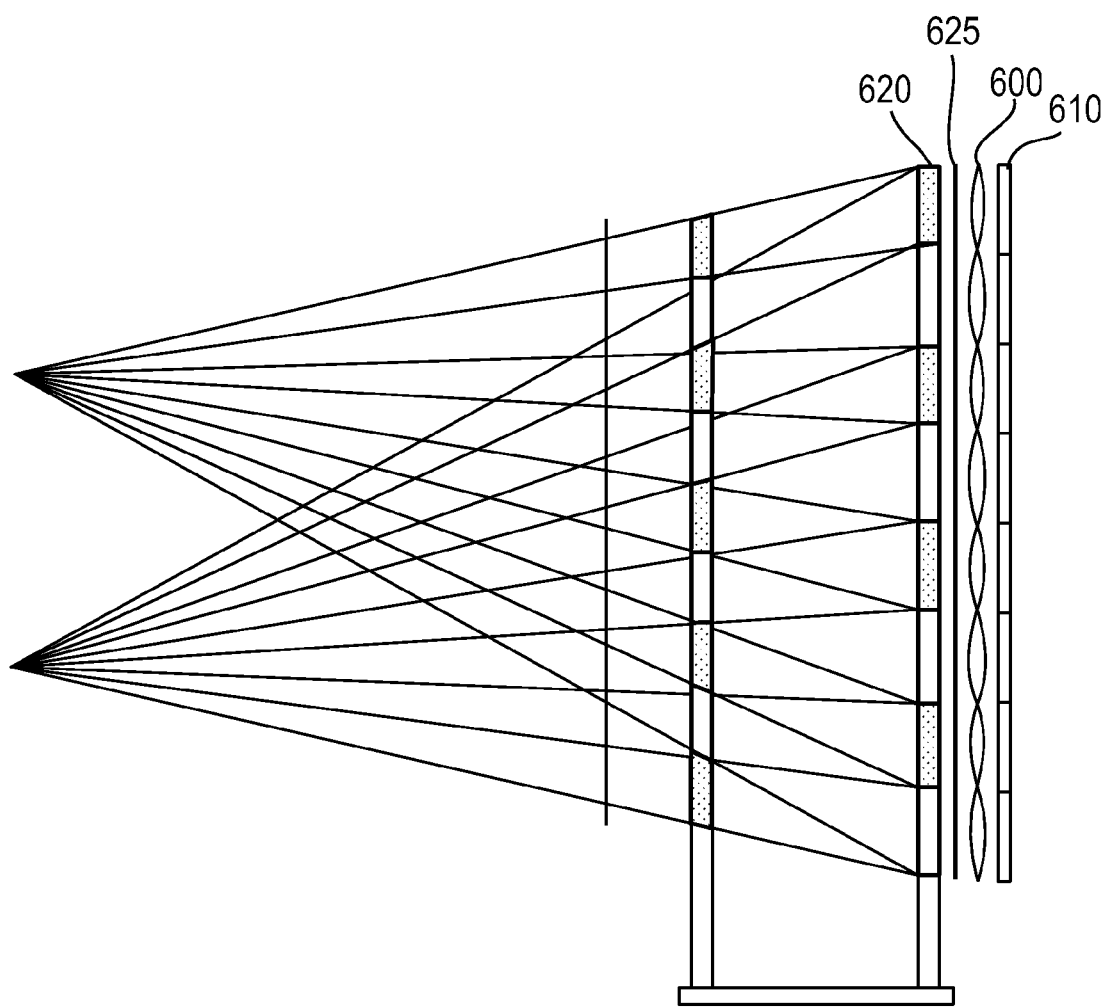
FIG. 8 is a simplified schematic of another embodiment utilizing light concentration, according to an embodiment of the present invention.
Figure 9:
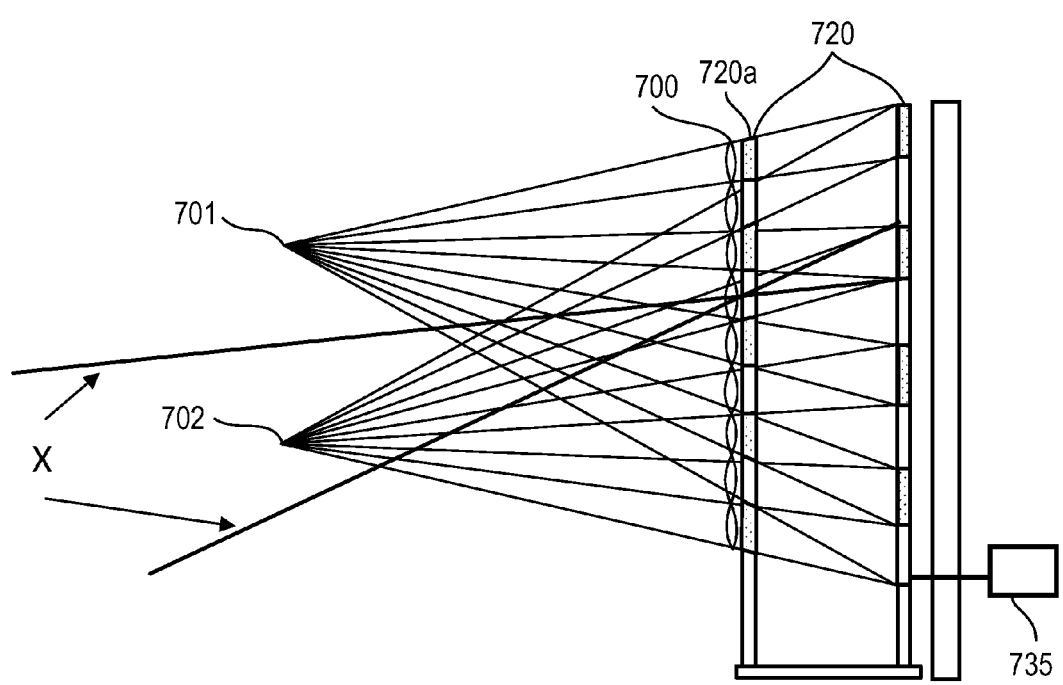
FIG. 9 is a simplified schematic of an embodiment incorporating a lenticular array positioned relatively near a viewer, according to an embodiment of the present invention.

FIGS. 7-9 below present lenticular arrays positioned near the display to enhance movement permissiveness of the system. Such arrays can be used together with an electronic aiming system as described in FIG. 5. When the lenticular arrays are near the display (as shown in FIGS. 7 and 8) the electronic aiming layer is most conveniently positioned at the second layer (nearest the viewer) of the two-layer filter pair. When the lenticular arrays are on the viewer's side of the apparatus (as shown in FIG. 9), then the aiming layer is most conveniently positioned at the first layer (nearest the display) of the apparatus.

Aiming of the images towards detected positions of the eyes of a viewer can be obtained using the "one-layer configurations" described above. The sections of consistent polarization of images, as shown in FIG. 3, may be several pixels wide. Similarly, the width of the sections of consistent image origin, as shown in FIG. 4, may be a number of pixels wide. Variable width and variable positioning of screens sections can then be coordinated with variable widths and positions of second-filter sections, enabling aiming the distance from the display, as well as aiming the horizontal position of the viewing zones. Such a system can also accommodate tilting of the viewer's head, and non-standard distances between the viewer's eyes.

Permissiviness of the Display, Freedom of Movement of the Viewer

Attention is now drawn to FIGS. 6A-6D, which are simplified schematics showing methods for enhancing movement-permissiveness of a display, according to methods of prior art. FIGS. 31-33a of PCTA, reproduced below as FIGS. 6A-6D, teach a method which enhances the "permissiveness" of the display. As the reader can verify using a straightedge rotating through a point distanced somewhat from the designated position of the viewer's eyes, in the system as described by FIGS. 1 and 2, when a viewer's eye is not exactly correctly positioned, some light from inappropriate images will be seen, creating what is called "cross-talk". Subtle cross-talk leads to eye fatigue and degradation of the stereoscopic viewing experience. Major cross-talk makes a system unusable.

The term "permissiveness" is used here to reflect the measure of the extent to which a viewer's left and right eyes can move away from their optimal positions, and still continue to see all the appropriate image light, and only appropriate image light, in each eye. PCTA shows that by blocking some pixel light in the display or by blocking some normally transmissive areas of one or another of the filters, relatively large "viewing zones" can be created, enabling a viewer to move around somewhat without thereby experiencing interference with the autostereoscopic viewing experience.

Figure 6A:
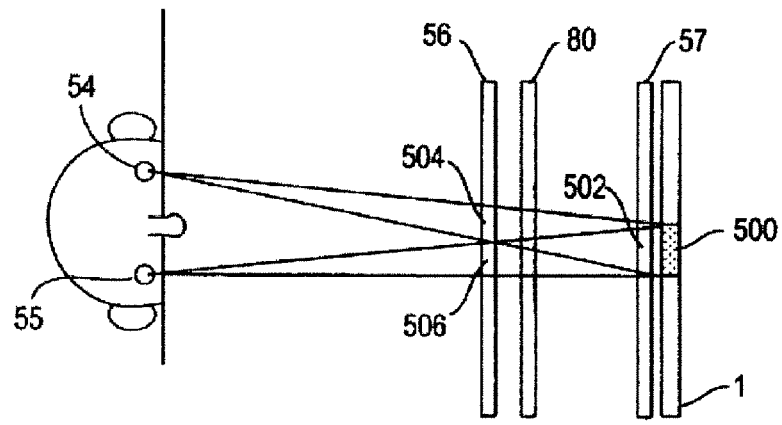
FIGS. 6A-6D are simplified schematics showing methods for enhancing movement-permissiveness of a display, according to methods of prior art.
Figure 6B:
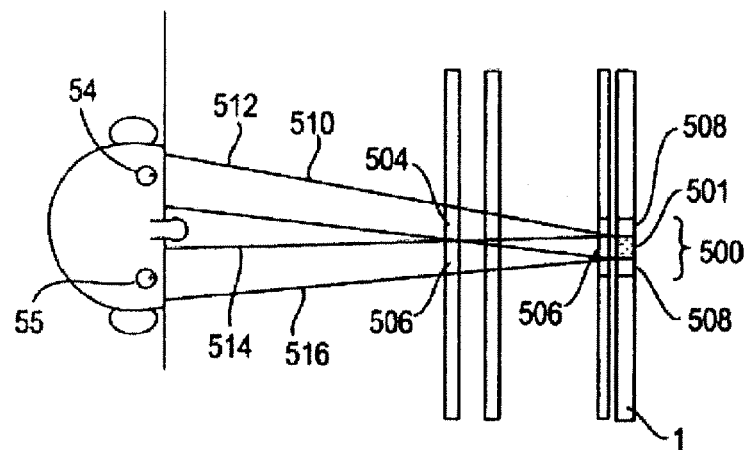
Figure 6C:
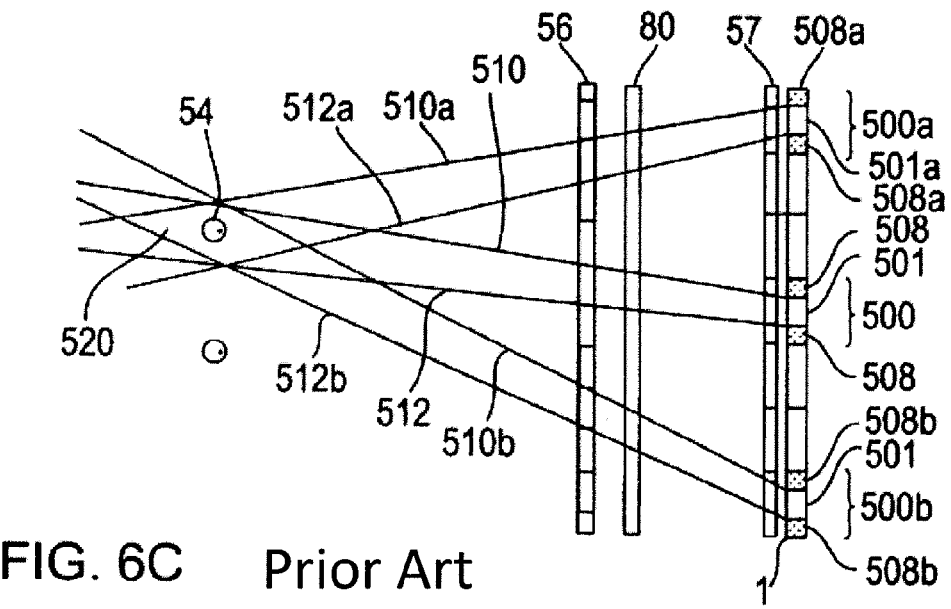
Figure 6D:
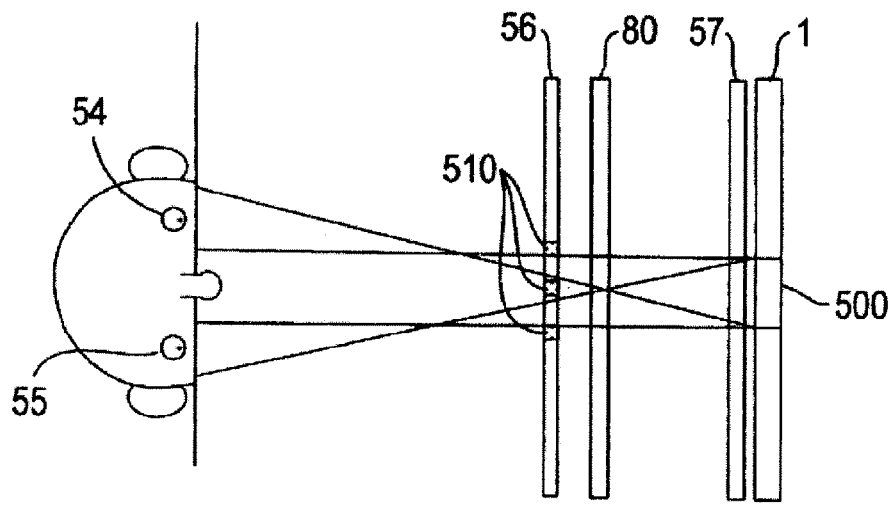

FIG. 6A shows the non-permissive viewing zones of a single pixel seen through an arrangement similar to that of FIG. 1. FIGS. 6B-6D shows permissive achieved as described in PCTA, by blocking light at one or more alternative positions. The methods shown in FIGS. 6B-6D will provide permissiveness, yet are inefficient because light is generated, then blocked. The higher the percentage of light-emitting or light-transmitting areas is blocked, the more the system is permissive, yet at the same time the more the light-emitting or light-transmitting areas are blocked, the dimmer the system and the less efficient the system. Yet permissiveness is important to the comfort and convenience of the viewer. A system requiring a viewer to remain in one spot is uncomfortable or impractical. A system using eye-tracking and aiming, yet which is non-permissive, requires eye-tracking which is highly accurate and an aiming system which is highly exact, requirements which tend to make a system both expensive and failure-prone.

Using Lenticular Arrays to Achieve Permissiveness

In some embodiments of the present invention, lenticular arrays are used in conjunction with light-controlling module which directs light of left image pixels towards a viewer's left eye and directs light of said right image pixels towards a viewer's right eye.

We describe below exemplary autostereoscopic display systems which comprise a) a display for displaying at least portions of a left image and of a right image which together comprise a stereoscopic image pair;

b) a light-controlling module for directing light of displayed left image portions towards a viewer's left eye and for directing light of displayed right image portions towards a viewer's right eye when the module is positioned between the display and a viewer and closer to the display than to the viewer; and c) a lenticular array distinct from said light-controlling module which serves to broaden viewing zones within which said viewer's eyes can move while continuing to see only appropriate image light from the display.

Several exemplary embodiments presented below show use of lenticular arrays together with other constructions which in themselves provide autostereoscopic viewing, the lenticular arrays providing efficient and comfortable means of achieving some movement permissiveness without major light loss. It is noted that although in examples here presented, versions of the two-filter light-controlling module presented above are shown being used in conjunction with lenticular arrays, this combination should not be though of as limiting. Lenticular arrays can be used in conjunction with other forms of light-controlling modules providing autostereoscopic viewing, to similar effect.

For example, lenticular arrays might be provided together with a parallax barrier to provide advantages of both. For example, one advantage of a parallax barrier over lenticular displays is that parallax barriers can be provided in electronically switchable format, either moveable sideways to aim the images, as shown in FIG. 5, or simply reversible, so as to provide, by rapid switching of the parallax barrier coordinated with rapid switching of displayed image portions, persistence of vision provides apparent full resolution viewing, as opposed to half-resolution imaging provided by the lenticular arrays and non-switching parallax barriers of prior art. However, such arrays are intrinsically non-permissive, unless portions of the display light is blocked, leading to dimness or inefficiency. Embodiments using a parallax barrier (optionally, a switchable parallax barrier) together with a lenticular array as taught hereinbelow, can provide a full-resolution movement permissive display.

Source Light Concentration

One such embodiment achieves movement permissiveness by pixel-light concentration.

A method for constructing permissive autostereoscopic displays comprises concentrating the light of each pixel or colored sub-pixel (e.g. each portion of an RGB triple) towards a central portion of that pixel or subpixel. For example, in an LCD display lenticles may concentrate light from a backlight towards a central portion (e.g. a central point or a narrow vertical band) within each controllable light-turning unit of an LCD display screen. Optionally, a diffusing screen (optionally, a non-depolarizing defusing screen) may be provided adjacent to the light-turning units, to enhance visibility.

For another example, lenticles might concentrate light, reflected from a DLP mirror towards a back projection screen, towards an array of discreet points or lines. Note that in this example, light concentrated toward a point or line may be light reflected by a single mirror of a DLP array, yet need not necessarily be so.

According to this lenticular light-concentration method, in contrast to the methods presented in FIGS. 6B-6D, generated light is optically concentrated rather than being blocked, so inefficiency is reduced or eliminated, and brightness of the display is not compromised.

In some embodiments a lenticular array is used to concentrate backlighting directed towards concentration regions within (e.g. in a vertical band near the center of) each pixel of a display such as an LCD display. In the case of the G Screen the concentration would be towards a concentration area near the output region of the pixel pairs used in that technology, and optionally onto a polarization-preserving diffusion layer in that place.

Attention is now drawn to FIG. 7, which is a simplified schematic of an autostereoscopic system which achieves movement permissiveness by pixel-light concentration, according to an embodiment of the present invention. In this exemplary embodiment, a light-controlling module (which may be, for example, a combined filter as presented by FIG. 1 or FIG. 2 is positioned in front of a display 500. Display 500 comprises a backlighting light source 520, a pixilated portion 530 (which may be an LCD screen array, a paired pixel array as used in the G Screen, or some other light-transmissive pixilated screen element, and between them a lenticular array 510 which serves to concentrate light from backlighting source 520 into concentration regions (e.g. towards the center, or towards a central vertical line) of the pixels of pixelated element 530. (Elements of FIG. 7, and in particular the lenses of lenticular array 510 are not drawn to scale. The lenses of lenticular arrays shown in the Figures herein are not drawn to scale and their appearances in the Figures are not intended to imply anything about the actual shape of lenses to be used, those shapes being determined by the purposes defined herein and according to well-known principles of optics.)

Attention is now drawn to FIG. 8, which is a simplified schematic of another embodiment utilizing light concentration, according to an embodiment of the present invention. The system shown in FIG. 8 comprises a lens array for concentrating (optionally onto a translucent surface) light emerging from a normally wide pixel of a pixilated display and directed towards a viewer, so as to present to the viewer's sight pixels formed as narrow dots or bands. When viewed through one or another version of the combined filter, here too the resultant effect will be enhanced permissiveness as shown in FIGS. 6B and 6C, without wastage of light energy and without a corresponding dimming of the display. It is anticipated that if the width of light-emitting portions of pixels is reduced but the intensity of light emitted by the pixels is not reduced as compared to that produced by a standard prior art display, then if such pixels are sufficiently small or are viewed from a sufficient distance, the resultant image will have an acceptably continuous appearance, yet will provide a high degree of movement permissiveness when combined with the second layers or first and second combined filter layers as discussed above. Referring to FIG. 8, lenticular array 600 is used to concentrate light emanating from a pixilated display 610 so that light passing through a first polarizing filter (or alternating birefringent layer) 620 appears to be emanating from a point or from a narrow band of light within each subdivision of layer 620, thereby achieving enhanced permissiveness of the display as described above. Optionally, a translucent layer may 625 may be provided between lenticular array 600 and filter 620, or else on the viewer side of 620 and adjacent to it.

The methods of FIGS. 7 and 8 may also be used to enhance movement permissiveness in a parallax barrier display, a display comprising a light-controlling module using color filtration, or other types of light-controlling modules providing autostereoscopic viewing.

Lenticular Array on Viewer's Side of Combined Filter

Attention is now drawn to FIG. 9, which is a simplified schematic of an embodiment incorporating a lenticular array positioned relatively near a viewer, according to an embodiment of the present invention.

Lenticular arrays traditionally used in 3D displays provide autostereoscopic viewing by directing a viewer's right and left eyes to different pixels, the display presenting columns of left image pixels interleaved with columns of right image pixels. Often, pixels showing yet additional views (usually to portray objects from yet additional viewpoints) are also interleaved. In lenticular displays of prior art at least two pixels, representing left and right image pixels (and sometimes more, if optional additional views are represented) are aligned with each individual lenticle.

FIG. 9 shows an embodiment of the present invention in which a lenticular array 700 is used to provide enhanced permissiveness in a display system which is otherwise similar to those disclosed in FIGS. 1-6 above. A display source, which might for example be a "3D Ready" DLP screen, or a G Screen or a fast switching screen as described above, or another screen, presents light to a filter pair or to only a second filter, as discussed above.

In the exemplary embodiment shown in the figure, each lenticle of lenticular array 700 is aligned with a single pixel on the display (or on the first layer if present). Presence of lens array 700 does not alter the effect of the polarizing filtration system, which still prevents inappropriate light from reaching either eye. The effect of the lens, however, is to present to an eye in any position within a wide viewing zone represented by the lines labeled "X" in the figure, a magnified image of a portion of each pixel. Under this arrangement each eye can wander freely within the broad viewing zone thus created, yet each eye can still see appropriate light from all pixels of the display which are emitting appropriate light for that eye. At optimal distances, the maximum width of the permissive viewing zone, for each eye, approaches the distance between the viewer's eyes, usually around 6.5 cm.

FIG. 9 shows lenticular array 700 positioned closer to the viewer than is the second layer, here marked 720A. It is noted that the lens elements of array 700 can also be positioned between layers 720A and 720B, preferably close to layer 720A, and indeed lens elements of array 700 can even straddle the polarizing elements of layer 720A.

Simplified Eyetracking

Some embodiments include both permissiveness features and eyetracking and image aiming features. In general, the presence of high permissiveness in an aimable display vastly simplifies the problems otherwise involved in tracking the viewer's eyes and aiming the display.

If the system is both permissive and also aimable, simpler, slower and more approximate eye-tracking can be used, simpler, slower, and less expensive aiming methods can be used, and the viewer can yet experience good or excellent performance of uninterrupted 3D viewing while he moves around.

The system of FIG. 9 optionally comprises an eye-tracking module, such as a camera and image interpretation software, and a display controller which receives eye position information from the eye-tracking module. After alignment and calibration, the eye-tracking module is able to detect where the viewer's eyes are in relation to viewing zones predicted or detected to exist, their positions being a function of the positioning of the sections of the second layer (as defined and explained above), and as a function of the positioning of the sections of the first layer and/or of the pixel positioning and optionally of the pixel groupings (as defined above) of the pixels of the display (in the absence of a first layer). If one or both of the first and second layers comprises switchable birefringent elements as discussed above, then the controller is able to switch those elements as appropriate, and to calculate the influence of that switching in determining the positioning of the viewing zones.

With use of lenticular array 700, the viewing zones may be relatively wide (up to the inter-ocular distance of the viewer), so a viewer making random or semi-random or other types of free movements while watching the screen will, on average, spend almost half his time in the correct viewing zone (where both eyes see light from appropriate images), and will on average spend almost half his time in the incorrect viewing zone, where both eyes see only inappropriate light.

To handle this situation, in some embodiments the controller is programmed to detect the presence of eyes in inappropriate viewing zones, and to correct the situation by simply switching which image, of the left and right images, is displayed with which polarization. In other words, if the system detects that they viewer's right eye is in the left-eye viewing zone and the left eye in the right zone, it simply displays right image light with polarization orientation(s) that had previously been used to display left image light, thereby causing each eye to find itself in the correct viewing zone. This is a highly simplified and relatively inexpensive image aiming system requiring only a camera and image interpretation software (or other eyetracking module) and a display controller which alters display polarization parameters when appropriate.

The Practicality of Physical-movement Aiming

The system described in the previous paragraph can provide autostereoscopic viewing if a viewer's eyes are in the correct viewing zones and also if his eyes are in the incorrect viewing zones, but what if they are on or near the border between those two? If a viewer is moving often and rapidly (e.g. in a game-playing situation at a kiosk) moments of being at or near the viewing zone border might not be very noticeable. However in some circumstances, for example that of a tranquil viewer working at his desk, it would be desirable to move that viewing-zone border when the viewer's eyes get too close to it, to avoid situations where an eye sees light from both images, or situations in which the system is constantly switching back and forth between two configurations because of tiny changes in viewer position.

One option is to solve the problem by means of an electro-mechanical apparatus to move parts of the display one with respect to another. It should be noted that the inclusion of either a viewer-side lens array like lens array 700 of FIG. 9, or else of source-side light concentrators similar to those shown in FIGS. 7 and 8, make the system highly permissive. This means that the eye-tracking need not be highly accurate, and that the electromechanical apparatus need not be highly accurate nor particularly rapid. All the system need do is to maintain a viewing zone (which may be 6 cm or more in width), somewhere around the viewer's eye. Under this requirement, minor inaccuracies and delays in compensation for viewer movement are highly tolerable. Under these circumstances, using an electromechanical element in a display aiming system may be practical, and may be substantially less expensive to implement than an alternative requiring electronically switched liquid crystal layers.

Aiming module 735 is shown in FIG. 9 but is to be understood as being applicable also to embodiments shown in each of the other figures herein. Aiming module 735 comprises eye-detection apparatus for detecting positions of a viewer's eyes, a controller for calculating required changes to system configurations in order to aim the viewing zones appropriately with respect to the eyes of a viewer. Aiming module 735 is also operable to calculate which image is appropriately displayed in which viewing zone (as discussed above) and to command a display controller to display images according to that calculation. Aiming module 735 may also comprise mechanical and/or electromechanical means for physically moving components of display and/or lenticular array and/or light-controlling module so as to affect the positioning of viewing zones with respect to the display and/or with respect the detected positions of the eyes of a viewer.

Note that in some embodiments the movement called for can be very small, since moving, say, the second layer with respect to the display, or moving light concentration points within the display module, require movements over distances similar to half the width of a single pixel. Should movements of that size be difficult to accurately control, another alternative is to move larger components longer distances, for example to move a first filter layer with respect to a second filter layer. Note also that whereas sideways movement of one component with respect to another can be continuous and under control of a sensor-driven feedback system, it can also be 'binary'. That is, whatever component is being moved can be allowed only two possible positions, and be shuttled back and forth between those positions by means of a relatively simple switchable electromagnetic attraction/repulsion. These factors make a mechanical tracking system more practical than would otherwise be the case.

This 'binary movement' possibility utilizes the fact that the system can provide nearly continuous autostereoscopic viewing with no movement required, with polarization patterns of images being switched electronically as described above whenever a viewer's eyes are in incorrect viewing zones. Consequently the movement system need only move the borders of those viewing zones from time to time, whenever a tranquil and slow-moving viewer happens to settle into a position where his eyes are near the viewing zone borders. Since the viewing zone jump will be on the order of 3.5 cm each time, frequent and fine adjustments of position are not needed. It is also noted that since the movement can be undertaken when a viewer is near but not on a viewing-zone border, no visible effect should be felt by the viewer when the viewing-zone border is used.

Mechanical options include the following: moving first and second layers with respect to each other, moving the second layer with respect to the display, moving (physically or by selecting among optional light paths) the position of the light source in a DLP projector, physically moving the concentration points of light being concentrated before, in, or after the display source or the first layer, using source layer concentration and an electronically switchable second layer, and others. It is noted that with source layer concentration and a switchable second layer, the switchable second layer need not be finely divided: it is sufficient for it to have elements which may be grouped in units of two elements per group, switchable between a configuration of, say groupings of units (1,2)(3,4)(5,6) . . . and a configuration of groupings (2,3)(4,5),(6,7) . . . . Switching between configurations would have the effect of switching the position of the viewing zones by exactly half a viewing-zone width. With such a system, all that is required to maintain autostereoscopic viewing during viewer movement is simply to periodically detect the relationship between the eye positions and the borders of the current and the alternative viewing zone positions, and select a grouping configuration that maximizes the minimum distance between the viewer's eyes and a viewing zone border. Switching of viewing zones from one configuration to the alternative configuration should be largely or completely unnoticeable to the viewer, as long as his eyes remain in the appropriate zones both before and after the switch.

Note also that the movement of one component with respect to another, required to shift viewing zones from one optional position to another, can also be accomplished by electro-optical means. Display systems recently marketed by Phillips and others include lenticular components based on shaped liquid crystals which behave as lenses when in one switchable state, and behave as simple transparencies when in a second switchable state. One may use such a switchable lensing system to selectively switch on or off an optical configuration that cause the display image, or the light concentration pattern input to the display image, to appear to move sideways by the distance of ½ pixel width.

Figure 10:
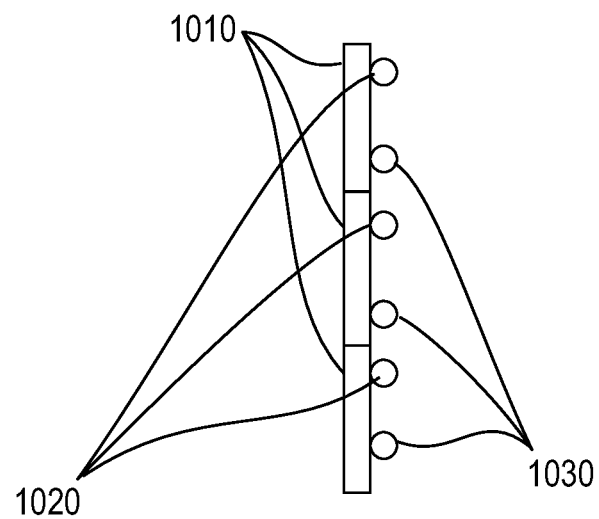
FIG. 10 is a simplified schematic of a portion of an autostereoscopic display system, showing positions for switchable light-concentration positions or for switchable light sources, according to an embodiment of the present invention.

Attention is now drawn to FIG. 10, which is a simplified schematic of a portion of an autostereoscopic display system, showing positions for switchable light-concentration positions or for switchable light sources, according to an embodiment of the present invention.

As discussed above, some embodiments may switch between two alternative sets of light concentration regions, or two sets of light sources, for light input to the display. As shown in the Figure, rather than concentrating light at the center of each physical display screen pixel, light is concentrated at a first position near one side of each physical display pixel, or at a second position near a second side of the pixel, and is controllably switched from one to the other (e.g. by movement e.g. by electromagnets, or by electro-optical means such as a selectively operable optical configuration, a shifting lightpath in a DLP or other projector, by activating or deactivating a liquid crystal, or by any other mechanical, electrical or optical means). The light concentration point may be moved back and forth from a first position to a second position ½ pixel pitch away, within the same pixel, and near the other side. Note also that rather than switching positions at which light is concentrated after emanating from a common source, in alternative embodiments two sets of light sources may be provided and the display switched between using one and using the other. That is, as an alternative to light concentration positions created by lenticular arrays or mirrors or other light concentration devices, the indicated positions can simply be positions of interleaved light sources such as bright wires or optical light conduits with light output along their lengths, interleaved so that by electrical or electro-optical switching, first light sources behind one part of each pixel can be caused to alternate with second light sources behind another part of each pixel, according to the needs reported by the eyetracking module. Note that this system is somewhat similar to a construction sometimes used to show 3D by selecting light sources in a manner that insures that a pixel showing left image light is between a selected light source and a viewer's left eye, and a pixel showing right image light is between the light source and a viewer's right eye, with light sources selectively turned on and off so as to avoid illuminating a pixel for an inappropriate eye. Embodiments of the present are similar to such systems in that both include selective light sources positioned behind a pixilated display, but differ from such systems because first and second light-concentration positions or first and second light sources are found behind each pixel, one near the left side of the pixel and the other near the right side of the pixel. Thus in the embodiment here presented, all pixels are illuminated for both eyes at all times (though the pixel light may or may not be selectively blocked by the combined filter system and the image polarizations).

Figure 11:
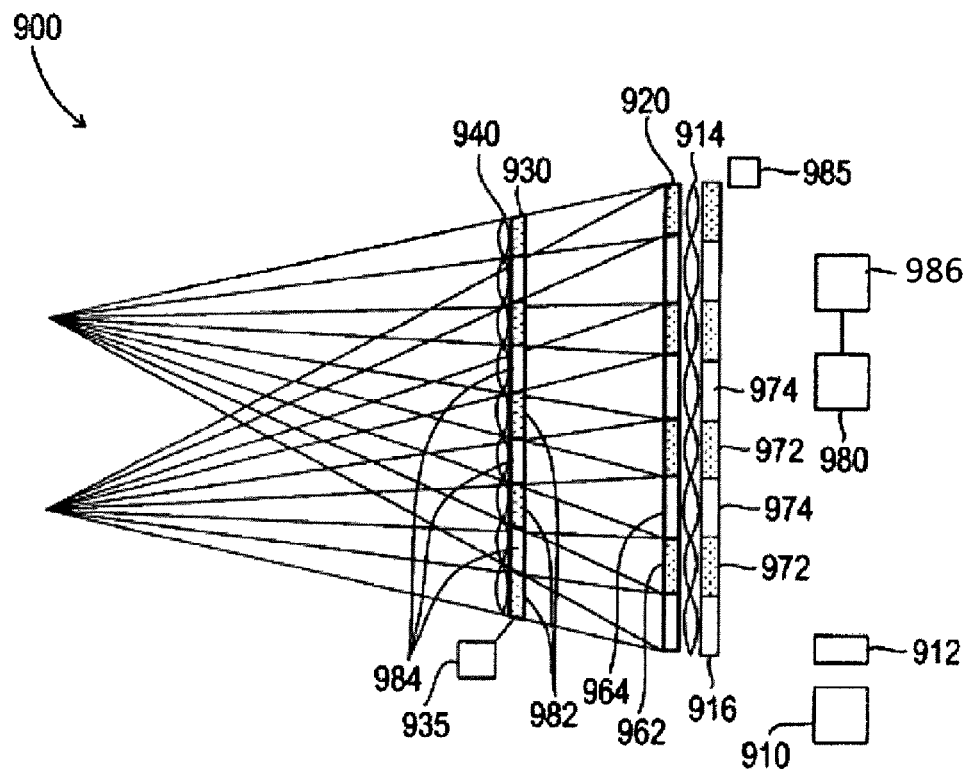
FIG. 11 is a simplified schematic showing an autostereoscopic display system using color filtration, according to an embodiment of the present invention.

Attention is now drawn to FIG. 11, which is a simplified schematic showing an autostereoscopic display system using color filtration, according to an embodiment of the present invention.

FIG. 11 presents a system 900 in which color images are provided by project from a DLP chip. DLP chip 980 receives light from a light projector 910, which comprises a color wheel operable to project colors from two mutually exclusive sets of color ranges, as discussed above with respect to the color filtration embodiment presented in FIG. 3. An optional aiming device 986 optionally comprises an eye-position detector for detecting positions of viewer's eyes. Aiming device 986 optionally commands a) a mechanical device 935 for moving components of the system device one with respect to another and/or b) an electro-optical device 912 for affecting the light path of light projected between light source 910, DLP chip 980, and a back projection screen 920, and/or c) a display controller (not shown) for controlling which image is projected in which set of colors, to provide adaptation to a user's eye positions, as described hereinabove. Since system 900 may be subject to random movements and to heating and cooling which may affect internal alignments, a sensor 985 is provided in the vicinity of the projection screen, and is operable to provide feedback useable by aiming device 986 to maintain the required spatial relationships among components as specified in the discussion above relating to the color filtration embodiment presented in FIG. 3. Thus aiming device 986 may be programmed to do any of the following: a) maintain internal alignment of projected images with respect to the positions of color filters, b) switch image color assignments according to viewer's eye positions, and c) move light path and/or physical components to appropriately aim viewing zones with respect to positions of eyes of a viewer.

Optional lenticular arrays 914 and 940 are provided to add movement-permissiveness to the system, as extensively described above. Color filter 930 corresponds to color filter 230 of FIG. 3, where sections 982 pass colors of a first color range and sections 984 pass colors of a second color range.

It is expected that during the life of a patent maturing from this application many relevant display devices and many relevant light-controlling modules will be developed and the scope of the term "display" and of the term "light-controlling module" is intended to include all such new technologies a priori.

As used herein the terms "about" and "approximate" refer to ±10%.

The terms "comprises", "comprising", "includes", "including", "having" and their conjugates mean "including but not limited to".

The term "consisting of" means "including and limited to".

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An autostereoscopic display system comprising:
   a display comprising a plurality of elements each of which are configured to display at first times a portion of a left image and at second times a portion of a right image, wherein the left and right images together comprise a stereoscopic image pair;
   a light-controlling module configured to:
      direct light from the plurality of elements towards a left eye viewing zone at the first times when the portion of the left image is displayed; and
      direct light from the plurality of elements towards a right eye viewing zone at the second times when the portion of the right image is displayed, wherein the module is positioned between the display and the viewing zones, and wherein the light-controlling module is closer to the display than to the viewing zones, wherein the light-controlling module comprises a color filter configured to pass first color ranges of the directed light and to block second color ranges of the directed light;
   a sensor configured to provide feedback based on the directed light, wherein the feedback comprises information necessary to maintain required spatial relationships of components of the color filter; and
   a lenticular array distinct from said light-controlling module configured to magnify views of each of the elements when the elements are viewed from within the viewing zones, wherein the viewing zones are broadened based upon the magnification.

2. The system of claim 1, wherein the lenticles are so sized and positioned that from an eye position within one of the viewing zones, a view through a first lenticle shows a magnified image of a portion of a first of the elements, a view through a second lenticle adjacent to the first lenticle shows a magnified image of a portion of a second of the elements, and the first element is adjacent to the second element on the display.

3. The system of claim 1, wherein the light-controlling module comprises a filter configured to block polarized light, and the lenticular array is proximate to the filter.

4. The system of claim 1, further comprising an eye-position detection module configured to detect positions of eyes of a viewer.

5. The system of claim 4, wherein the light-controlling module comprises electronically switchable birefringent subsections and a controller configured to calculate which combination of neighboring subsections are to be switched to same states of birefringence in order to aim viewing zones towards detected positions of viewer's eyes based on eye position information detected by the eye position detection module.

6. The system of claim 4, further comprising a mechanical device configured to move one component of the system with respect to another in response to eye-position information detected by the eye-position detection module.

7. The system of claim 1, wherein the light-controlling module comprises a two layer filter, each layer of which comprises multiple first and second polarizing filter segments, the first and second segments configured to have orthogonal polarization orientations, the first and second segments are alternatingly positioned across the first and along the second filter layers.

8. The system of claim 1, wherein the light-controlling module comprises a first filter which comprises multiple first and second segments alternatingly positioned across the first filter, the first and second segments configured to have birefringence characteristics such that polarization orientation of polarized light passing through the first segments is rotated approximately 90° more than polarized light passing through the second segments.

9. The system of claim 8, wherein the light-controlling module further comprises a second filter which comprises multiple first and second filter segments which filter polarized light, the first segments of the second filter configured to have a polarization orientation orthogonal to that of the second segments of the second filter, the first and second segments are alternatingly positioned across the second filter.

10. The system of claim 9, wherein one of the filters comprises a birefringent element whose birefringence is switchable under electronic control.

11. The system of claim 1, wherein the color filter comprises first and second sections alternatingly positioned across the color filter, wherein the first sections are configured to pass the first color ranges of the directed light and to block the second color ranges of the directed light, and wherein the second sections are configured to pass the second color ranges of the directed light and to block the first color ranges of the directed light.

12. The system of claim 4, comprising a mechanism configured to selectively illuminate first positions or second positions within the display based on information detected by the eye-position detection module.

13. The system of claim 4, further comprising a component operable to be positioned at one of two possible positions, a mechanism configured to position the component at one of the two possible positions, and a controller configured to select one of the two possible positions based on information supplied by the eye-position detection module, wherein a first portion of a left image and a first portion of a second image are displayed in a first position, and wherein a second portion of the left image and a second portion of the right image are displayed in the second position.

14. The system of claim 4, further comprising a controller configured to select one of two possible display modes based on information supplied by the eye-position detection module.

15. The system of claim 14, wherein the controller is further operable to command a configuration change when information supplied by the eye-position detection module shows that a viewer's eye is near a border of a viewing zone.

16. The system of claim 15, wherein the configuration change comprises a switch of birefringence of a component having electronically controllable birefringence.

17. The system of claim 16, wherein the configuration change comprises mechanical movement of a component of the system.

18. The system of claim 8, wherein at least one of the filters comprises a birefringent element whose birefringence is switchable under electronic control.

19. The system of claim 9, wherein at least one of the filters comprises a birefringent element whose birefringence is switchable under electronic control.

* * * * *